United States Patent
Hammerschmidt et al.

(10) Patent No.: US 10,024,360 B2
(45) Date of Patent: Jul. 17, 2018

(54) AXIAL BEARING AND RETAINER

(71) Applicant: SKF Marine GmbH, Hamburg (DE)

(72) Inventors: Detlef Hammerschmidt, Rostock (DE); Mathias Rusch, Winsen Luhe (DE); Marko Wrage, Struvenhuetten (DE)

(73) Assignee: SKF MARINE GmbH, Hamburg (DE)

( * ) Notice: Subject to any disclaimer, the term of this patent is extended or adjusted under 35 U.S.C. 154(b) by 0 days.

(21) Appl. No.: 15/507,425

(22) PCT Filed: Aug. 12, 2015

(86) PCT No.: PCT/EP2015/068569
§ 371 (c)(1),
(2) Date: Feb. 28, 2017

(87) PCT Pub. No.: WO2016/030194
PCT Pub. Date: Mar. 3, 2016

(65) Prior Publication Data
US 2017/0284461 A1 Oct. 5, 2017

(30) Foreign Application Priority Data

Aug. 28, 2014 (DE) .................. 10 2014 217 221

(51) Int. Cl.
*F16C 27/08* (2006.01)
*F16C 17/04* (2006.01)
(Continued)

(52) U.S. Cl.
CPC ........... *F16C 27/08* (2013.01); *B63H 23/321* (2013.01); *F16C 17/04* (2013.01); *F16C 27/02* (2013.01);
(Continued)

(58) Field of Classification Search
CPC .......... F16C 27/08; F16C 17/04; F16C 27/02; F16C 2326/30
See application file for complete search history.

(56) References Cited

U.S. PATENT DOCUMENTS 3,937,534 A * 2/1976 Welch ..................... F16C 17/06
384/420
4,542,995 A * 9/1985 Shibasaki ............... F16C 27/08
384/224
(Continued)

FOREIGN PATENT DOCUMENTS

DE         209016 A1    4/1984
DE       3326415 A1    2/1985
(Continued)

*Primary Examiner* — Thomas R Hannon
(74) *Attorney, Agent, or Firm* — Bryan Peckjian; SKF USA Inc. Patent Dept.

(57) ABSTRACT

A thrust bearing configured to support axial loads that act on a rotating body includes a thrust shaft rotatably supportable in a bearing housing, a thrust collar, and a retainer connected to the thrust shaft and configured to support a plurality of thrust pieces. The thrust pieces each have a front sliding surface in sliding contact with the thrust collar, and the retainer includes a disk having a central opening and an outer circumference and a plurality of radial incisions extending radially inwardly from the outer circumference which incisions have inner ends radially spaced from the central opening. The radial incisions define circumferentially adjacent spring sections each of the which is individually axially flexible against and away from the bearing housing to open and close a spring gap between each of the spring sections and the bearing housing.

12 Claims, 3 Drawing Sheets

(51) Int. Cl.
*F16C 27/02* (2006.01)
*F16C 41/02* (2006.01)
*B63H 23/32* (2006.01)

(52) U.S. Cl.
CPC ........ *F16C 41/02* (2013.01); *B63H 2023/325* (2013.01); *F16C 2326/30* (2013.01)

(56) References Cited

U.S. PATENT DOCUMENTS

| | | |
|---|---|---|
| 8,439,567 B1 | 5/2013 | Armentrout et al. |
| 8,800,686 B2 * | 8/2014 | Sexton .................... E21B 4/003 |
| | | 175/371 |
| 9,127,713 B1 * | 9/2015 | Lu .......................... F16C 33/043 |
| 2013/0182980 A1 | 7/2013 | Peterson et al. |
| 2016/0186800 A1 * | 6/2016 | Bang ....................... F16C 41/02 |
| | | 384/105 |

FOREIGN PATENT DOCUMENTS

| | | |
|---|---|---|
| DE | 102008037677 A1 | 8/2008 |
| FR | 2333156 A1 | 6/1977 |
| GB | 221789 A | 7/1925 |
| JP | 6337818 U | 3/1988 |
| JP | 2000065047 A | 3/2000 |
| KR | 100748595 B1 | 8/2007 |
| WO | 8100898 A1 | 4/1981 |

\* cited by examiner

AXIAL BEARING AND RETAINER

CROSS-REFERENCE

This application is the U.S. National Stage of International Application No. PCT/EP2015/068569 filed on Aug. 12, 2015, which claims priority to German patent application no. 10 2014 217 221.7 filed on Aug. 28, 2014.

TECHNOLOGICAL FIELD

The invention relates to a thrust bearing, wherein the thrust bearing is configured for supporting of axial loads acting on a rotating body. The invention further relates to a retainer for retaining a plurality of thrust pieces in a thrust bearing.

BACKGROUND

Such an axial bearing or thrust bearing is used, for example, in watercraft for supporting of their propeller shaft. Caused by manufacturing tolerances, assembly tolerances, static and dynamic shaft deformations and the like, an angular difference can set in between the thrust shaft axis and the thrust-bearing-housing axis. Depending on its size the angular difference between these two axes leads to an uneven distribution of the axial load onto the individual thrust pieces or pressure pieces of the thrust bearing. The thrust pieces more highly loaded due to the uneven axial load distribution are subject to an increased thermal load and often also to additional wear, since due to the hydrodynamic lubricating, sufficient lubricant film cannot be established between its sliding surface and a shaft-side thrust collar.

A thrust bearing for the supporting of axial loads is known from DD 209 016 A1, which has a thrust shaft rotatably supported in a bearing housing, which thrust shaft is couplable with a rotating body and which includes at least one thrust collar. The thrust bearing also includes a plurality of thrust pieces, which each have a front sliding surface for sliding contact with the at least one thrust collar. To compensate for angular differences between the thrust shaft axis and the bearing housing axis the thrust pieces are supported rear-side via pressure plates on axial hydraulic cylinders. The hydraulic cylinders are fluidly connected to one another among one another via a ring line such that as soon as a thrust piece experiences an over- and under-load, compared to the other thrust pieces, due to a bearing change, a hydraulic load balancing is effected via the ring line, and the axial position of all thrust pieces is adjusted accordingly. However, the hydraulic cylinder and the ring line are expensive in terms of device technology and manufacturing technology, prone to leakage, and maintenance-intensive. In particular, leakages can lead to a complete failure of the thrust bearing.

A thrust bearing is known from DE 10 2008 037 677 A1 wherein the thrust pieces are also supported rear-side on hydraulic cylinders. In contrast to the thrust bearing shown in DD 209 016 A1 the thrust pieces can be embodied two-part, wherein a thrust-piece head that forms a front sliding surface is supported on a thrust-piece foot via a Belleville washer. However, from a device-technology and manufacturing-technology perspective this thrust bearing is even more complicated than the above-described thrust bearing according to DD 209 016 A1.

SUMMARY

It is an object of the invention to provide a thrust bearing for the supporting of axial loads that act on a rotating body, which makes possible a high operational reliability and a uniform load distribution with a low cost in terms of device technology and manufacturing technology. Furthermore, it is an object of the invention to provide a retainer for retaining a plurality of thrust pieces in such a thrust bearing.

An inventive thrust bearing for supporting of axial loads that act on a rotating body includes a thrust shaft rotatably supported in a bearing housing, which thrust shaft is couplable with a rotating body and which includes at least one thrust collar. In addition, the thrust bearing includes a plurality of thrust pieces that each include a front sliding surface for sliding contact with the at least one thrust collar and form two thrust-piece ring assemblies disposed on both sides of the thrust collar. The thrust bearing has two retainers for retaining the thrust-piece ring assemblies. According to the invention the retainers each have a positioning section for stationary positioning and a spring-ring section for axial-elastic deforming in the event of exceeding of a load limit acting on at least a plurality of the thrust pieces, wherein a spring gap is formed between the spring-ring sections and a respective rear-side housing section, and wherein with respect to a longitudinal axis of the thrust shaft the spring-ring sections are disposed radially outward and the positioning sections radially inward, and/or the spring-ring sections include a plurality of spring-ring segments lying adjacent to one another in the circumferential direction, wherein for forming the spring-ring segments radial incisions are introduced into the spring-ring sections.

According to the invention a more uniform load distribution on a plurality of thrust pieces is achieved by a resilient retaining of the thrust pieces. The highly loaded thrust pieces transmit larger axial forces into a resilient thrust-piece retainer, which thrust pieces thereupon realize a greater spring travel in the axial direction corresponding to their spring characteristic curve. Correspondingly smaller spring travels are realized by lightly loaded thrust pieces. Due to the combination of the resilient retaining of the thrust pieces and the load balancing between the thrust pieces in a component, the resilient thrust-piece retainer, a simpler construction and a more operationally reliable operation of the axial bearing or thrust bearing is achieved even with the presence of an angle between the thrust-bearing-shaft axis and the bearing-housing axis. An aligning of the inventive axial bearing for elimination of angular deviations between these two axes is not necessary. In other words, due to the inventive solution, an improvement of the load distribution onto a plurality of thrust pieces is achieved with reduced expense in terms of manufacturing technology and device technology without rework or alignment work being necessary in the thrust-bearing installation. A thermal load on the thrust bearing is thereby achieved, excessive wear on the thrust pieces avoided, a failure of the thrust bearing is prevented, and thus a high operational reliability is ensured. The thrust shaft can have a thrust collar including two thrust-piece ring assemblies disposed on both sides. Alternatively but not in a limiting manner the thrust shaft includes two thrust collars, wherein a thrust-piece ring assembly is associated with each thrust collar, which thrust-piece ring assemblies either face each other rear-side between the thrust collars or are disposed front-side with respect to each other outside the thrust collars.

The incisions introduced into the spring-ring sections for forming the spring-ring segments here extend outward from a radially inner base and are axially open over their entire radial extension. Preferably the incisions have such an extension in the circumferential direction or width that they form gaps via which the respective adjacent spring-ring segments are spaced from one another. The spring-ring segments can thereby be elastically deformed without mutual interference. Alternatively the incisions have such a width that in the event of deforming the spring-ring segments can still laterally support or guide. The configuration of the spring-ring segments makes possible a greater spring effect and thus a more sensitive evening out of the load distribution than with a spring-ring segment closed over the circumference.

The spring-ring segments can have different shapes. For example, they can have different thicknesses or extensions in the deforming direction. The deforming direction here is the axial direction of the thrust shaft. Additionally or alternatively the incisions for forming the spring-ring segments can have different lengths or extensions in the radial direction. Due to different shapes of the individual spring-ring segments, each spring-ring segment can be given an individual spring characteristic and the load distribution thus adapted to, for example, shaft bend lines and the like. It is likewise conceivable to make thickness reductions and/or width reductions, for example in the form of lateral constrictions, in the transition region from the positioning section to the spring-ring segments, in order to form this region as a deformation- or spring-section and individually adjust the spring-ring segments. The thickness reduction can be effected, for example, in terms of manufacturing technology via an annular groove introduced rear-side in the spring-ring section.

It is advantageous in particular if each spring-ring segment retains a thrust piece. Each thrust piece is thereby associated with a single spring effect, which furthermore advantageously effects an equalizing of the load distribution.

To limit a maximum deforming of the spring-ring sections, housing sections that are rear-side seen from the spring-ring sections can each form an axial limit for the spring-ring sections. The spring-ring sections extend to these starting from a certain elastic deformation, whereby plastic deformations and thus damage to the spring-ring sections are avoided. Due to different spring-gap thicknesses between the spring-ring segments and the housing sections a resilience of the spring-ring segments can be adapted to, for example, shaft bend lines and the like.

In one exemplary embodiment the thrust pieces are inserted in a spring-ring-side end groove of the retainer via pins and secured therein against self-rotating. Such a retaining system of the thrust pieces can be formed easily in terms of manufacturing technology. The pins preferably have a circular cross-section and are thus manufacturable in terms of manufacturing technology as turned parts that can also be connected to the thrust pieces later. To avoid the self-rotating the thrust pieces can each have at least one additional pin or pin-type element, which pin or pin-type element runs into the end-groove wall in the event of a self-rotating of the thrust piece. Alternatively a rotation lock of the thrust pieces against self-rotating movements about their longitudinal axis can be effected by a corresponding pin shape. For example, the pins can have an elliptical cross-section or a angular cross-section.

In order to prevent the thrust pieces from moving along or inside the end groove, at least one thrust piece can have a fixing element for locking with the thrust collar. The thrust piece first inserted into the end groove during assembly preferably includes the fixing element.

For inserting the thrust pieces into the end groove it can have a radial opening. The thrust pieces are threaded sequentially into the radial opening and then moved in the circumferential direction inside the end groove. It is thereby possible to only install the thrust pieces when the thrust shaft is already lowered into a lower bearing-housing shell.

The positioning sections are preferably each a rear-side hub-type projection that immerses into an axial recesses of the bearing housing. Such positioning sections and recesses can be manufactured easily and make possible a reliable and stable positioning on or in the bearing housing.

The assembling of the axial bearing and in particular of the retainers can be simplified if the retainers are divided at least in two ring arcs. The retainers can thereby be positioned radially about the thrust shaft and need not be pushed onto it in the axial direction. In addition to the division of the retainers in two ring arcs it is also conceivable to divide the retainers in three, four, or more ring arcs.

An inventive retainer for retaining a plurality of thrust pieces in an axial bearing has a positioning section for stationary positioning in the axial bearing and a spring-ring section for axial-elastic deforming in the event of exceeding of a load limit acting on at least a plurality of the thrust pieces, wherein with respect to a longitudinal axis of the thrust shaft the spring-ring section is disposed radially outward and the positioning section radially inward, and/or the spring-ring section includes a plurality of spring-ring segments lying adjacent to one another in the circumferential direction, wherein for forming the spring ring segments radial incisions are introduced in the spring ring section. With a low expense in terms of manufacturing technology and in terms of device technology and with a high robustness such a retainer makes possible a reliable equalizing of a load distribution acting on the thrust pieces. The retainer is preferably comprised of a metal or a metal alloy.

In the following a preferred exemplary embodiment of the invention is explained in more detail with reference to schematic depictions.

DETAILED DESCRIPTION

Figure 1:
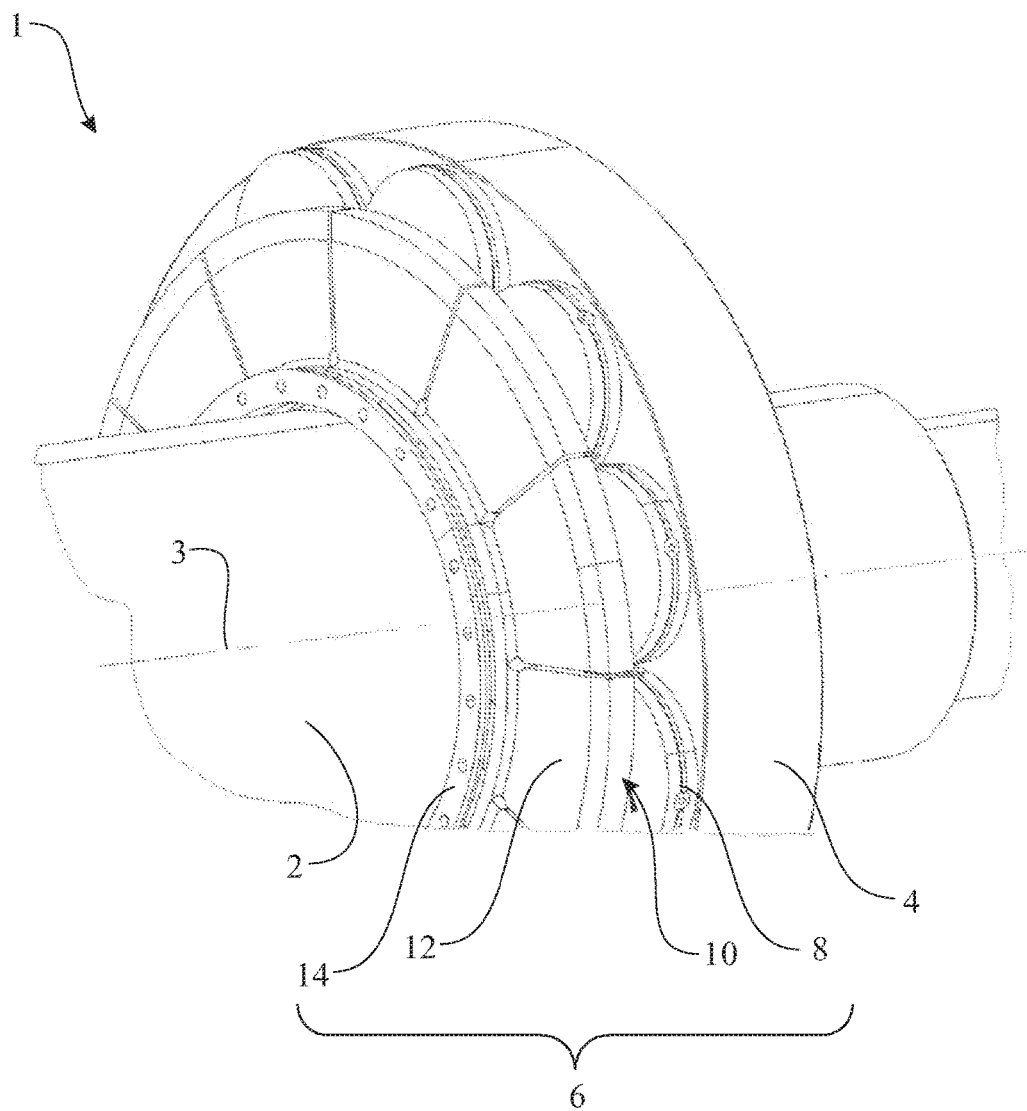
FIG. 1 shows a perspective depiction of a region of a thrust-piece ring assembly of an inventive thrust bearing.

According to FIG. 1, for supporting an axial load acing on a rotating body an inventive thrust bearing 1 has a thrust shaft 2 for coupling with the rotating body. The rotating body is not shown here. Likewise a bearing housing is not shown wherein the thrust shaft 2 is rotatably supported about its longitudinal axis 3.

The thrust bearing 1 is, for example, a propeller shaft of a ship and supports thrust forces of a propeller. The thrust shaft 2 is coupled end-side and aligned with the propeller shaft and a drive shaft. Turbines, blowers, cutter dredgers, and, for example, centrifugal pumps are other applications. The thrust shaft 2 has a thrust collar 4 connected such that it rotates together with the thrust shaft 2 or is formed one-piece therewith and two thrust-piece ring assemblies 6 disposed on both sides of the thrust collar 4, of which thrust-piece ring assemblies 6 for reasons of clarity only the left thrust-piece ring assembly 6 according to the depictions in FIG. 1 is depicted.

The left thrust-piece ring assembly 6 shown here will be explained below. The right thrust-piece ring assembly not shown is identically configured, with the result that what is stated below also describes the right thrust-piece ring assembly.

The thrust-piece ring assembly 6 has a plurality of thrust pieces 8 and a ring-type retainer 10 for retaining the thrust pieces 8. The retainer 10 itself has a spring-ring section or a spring ring 12 radially external with respect to the longitudinal axis 3 of the thrust shaft 2 and a radially internal positioning section or a hub 14. The thrust pieces 8 are disposed adjacent to one another in the circumferential direction of the retainer 12 and, in the region of the spring ring 12, disposed between the retainer 10 and the thrust collar 4.

Figure 2:
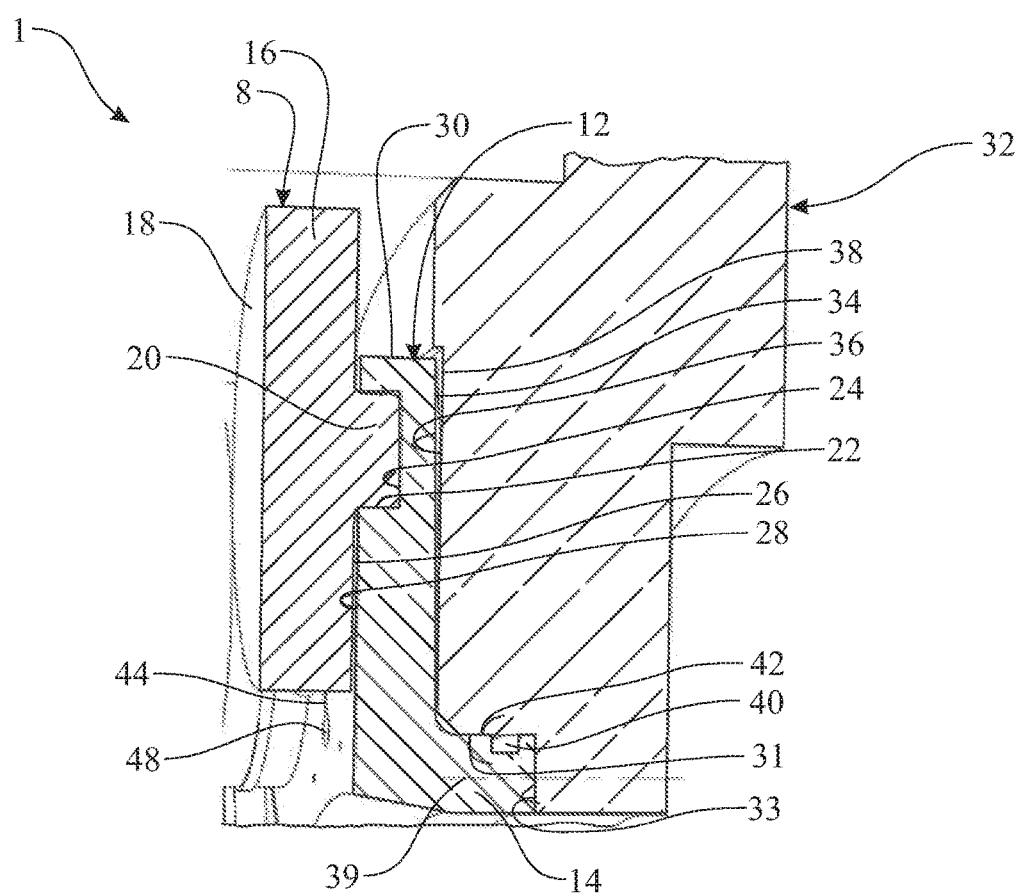
FIG. 2 shows a longitudinal section through the inventive thrust bearing in the region of the thrust-piece ring assembly.

According to the depiction in FIG. 2, the thrust pieces 8 each have a plate-shaped body 16 that includes a front sliding surface 18 sliding along the thrust collar 4. In addition, the thrust pieces 8 each have pins 20 for positioning on the retainer 10, which pins 20 extend rear-side and centrally therefrom.

For retaining the thrust pieces 8 or for receiving the pins 20 the retainer 10 has an end groove 22 in its spring rings 12, the axial extension or depth of which end groove 22 is set such that the pins 20 abut end-side on the end-groove base 24 and the plate-shaped bodies 16 are spaced here with their rear side 26 from a front surface 28 of the retainer 10, which front surface 28 receives the end groove 22. The end groove 22 of the retainer forms a ring and has a rectangular cross-section (see also FIG. 3). It is open via a not-shown radial opening to the outer circumference 30 of the spring ring 12 or of the retainer 10. The radial opening is such that the thrust pieces 8 can be threaded into it with their pins 20 and fed to the end groove 22. The end groove 22 can include a thrust piece receiving opening having an annular shape, as illustrated in FIG. 3.

Figure 3:
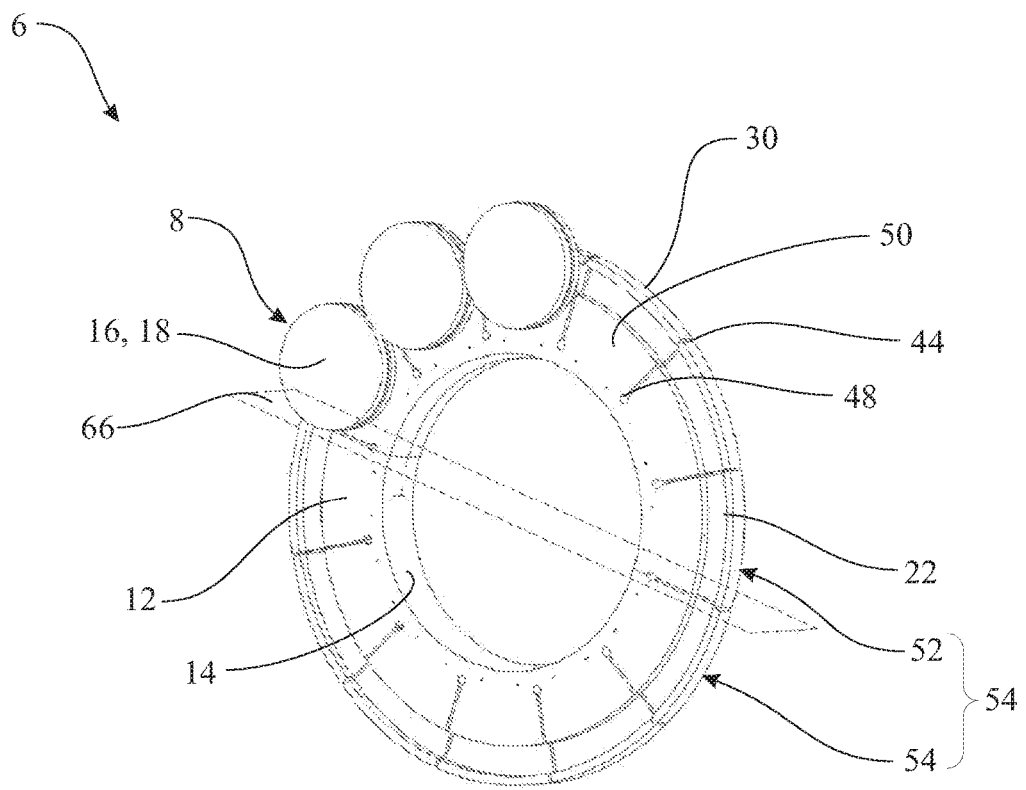
FIG. 3 shows a detail view of a thrust-piece ring assembly shown in FIGS. 1 and 2.

Preferably the plate-shaped bodies 16 and the pins have a circular cross-section, wherein a plate-body diameter is selected such that in the inserted state the thrust pieces 8 contact laterally (see also FIG. 3). A pin diameter is preferably such that the thrust pieces can perform slight movements in the radial direction as they are guided in a clearance-restricted manner in the end groove 22. The clearance facilitates, among other things, the introducing of the thrust pieces 8 into the end groove 22.

The thrust pieces 8 have not-shown rotation locks, for example, parallel pins disposed with respect to the pins 20, using which a self-rotation about its axial axis 29 is prevented. The thrust piece 8 last installed or last introduced into the end groove 22 also has a not-shown fixing element for fixing the thrust pieces 8 in the end groove 22 in order to prevent a displacing of the thrust pieces 8 inside the end groove 22. This rotation lock can also consist of a pin or pin-type element that engages in a corresponding securing groove of the respective retainer 10 or locks therewith in an interference-fit manner.

The positioning section 14 is configured as a rear-side hub that immerses into a radially inner axial recess 31 of a section 32 of the bearing housing. An axial extension or depth of the recess 31 is such that the positioning section or the hub 14 abuts end-side on the recess base 33 and an axial spring gap 38 is thereby formed between a rear side 34 of the spring ring 12 and an opposing housing-ring surface 36. Preferably as indicated by the dashed line the retainer 10 is screwed to the housing section 32 in the region of the positioning section 14. In order to prevent that a lubricating oil located in the bearing housing penetrates to the recess base 33, a seal ring 40 is inserted in the outer circumferential groove of the hub 14, which seal ring 40 sealingly abuts on an opposing inner circumferential surface 42 of the housing section 32.

The spring gap 38 is an axial ring gap and expanded in this exemplary embodiment radially from inward to outward in a wedge-shaped manner or open radially from inward to outward.

As shown in FIG. 3 the spring ring has a plurality of radial incisions 44 that extend radially from inward to outward. For reasons of clarity only one incision 44 is quantified representatively for all incisions in the retainer 10.

The incisions 44 are radially inwardly closed, and open to the outer circumference 30 of the spring ring 12. Each incision 44 has a radially inwardly lying base 48 that is located with the remaining incision bases 48 on a virtual circle that is located in the transition region from the positioning sections 14 onto the spring rings 12 (see also FIG. 2). To avoid notch effects the incision bases 48 are rounded. In this exemplary embodiment a plurality of identically large spring ring segments 50 are formed by the incisions 44, which spring-ring segments 50 each preferably receive a thrust piece 8. For reasons of clarity only one spring ring segment 50 is quantified representatively for all spring ring segments of the retainer 10. In the event of exceeding a load limit acting on at least a plurality of the thrust pieces 8 the respective spring-ring segment 50 performs an axial-elastic deformation, whereby an equalizing is effected of an axial load distribution acting on the thrust shaft 2.

For simplification of assembly the retainer shown here is divided in at least two ring arcs 52, 54. The ring arcs 52, 54 here are two ring halves that each span 180°. To align the ring halves in the assembled state they can include not-shown corresponding circumferential-side centering elements in the region of their separation plane 56 or their separation surfaces.

In operation the thrust shaft 2 is set into rotation, whereas the thrust-piece ring assemblies 6 is supported in the bearing housing in a stationary manner. The thrust collar 4 slides along the sliding surfaces 18 of the thrust pieces 8, wherein with its rotational movement it respectively at least sectionally immerses in an oil bath located in the bearing housing 32. A lubricant film thereby respectively forms on the sliding surfaces 18, with the result that a friction between the thrust collar 4 and the thrust pieces 8 is minimized and the sliding surfaces 18 are also cooled. In the normally loaded state or with coaxial orientation of the longitudinal axis 3 of the thrust shaft 2 with respect to the bearing housing axis the spring ring segments 50 are in the same or in essentially the same orientation.

However, as soon as an axial load is unequally distributed on the thrust pieces 8 due to an angular difference between the axes, in the event of the exceeding of a load limit an axial-elastic deforming of the spring rings 12 or their spring-ring segments 50 is established. The highly loaded thrust pieces 8 transmit larger axial forces, which thrust pieces 8 thereupon realize a greater spring travel in the axial direction corresponding to their spring characteristic curve. Correspondingly smaller spring travels are realized by lightly loaded thrust pieces 8. These different load-dependent deformations of the spring-ring segments 50 effect a more even load distribution of the axial load on a plurality of thrust pieces 8. A spring characteristic curve of the spring ring segments 50 is also configured such that the forming of the lubricant film is ensured.

A maximum axial-elastic deforming of the spring-ring segments 50 is limited here by a rear-side running-into the respective opposing housing-ring surface 36 by its rear side 34, so that plastic deformations of the spring-ring segments 50 and thus damage to the retainers 10 is prevented. Due to different configuration of the individual spring-ring segments 50, for example, due to having different thicknesses of individual spring-ring segments 50 or different lengths of the incisions 44, each spring-ring segment 50 can be given an individual spring characteristic value, and the load distribution can thus be adapted to, for example, shaft bend lines and the like. Alternatively and/or additionally the resilience of the spring-ring segments 50 can be adapted to, for example, the shaft bend lines by different spring gap widths between the spring ring segments 50 and the housing ring surface 36.

Disclosed is a thrust bearing for the supporting of axial loads that act on a rotating body, wherein the thrust bearing includes ring receptacles for the receiving of thrust pieces that each have a positioning section for stationary positioning and a spring-ring section for axial-elastic deforming in the event of exceeding of a load limit acting on at least a plurality of the thrust pieces, wherein a spring gap is formed between the spring-ring sections and respectively one rear-side housing section, as well as a retainer for such a thrust bearing.

REFERENCE NUMBER LIST

Ref. No. Description
1 Thrust bearing
2 Thrust shaft
3 Longitudinal axis
4 Thrust collar
6 Thrust-piece ring assembly
8 Thrust piece
10 Retainer
12 Spring-ring section/spring ring
14 Hub
16 Plate-shaped body
18 Sliding surface
20 Pin
22 End groove
24 End-groove base
26 Rear side
28 Front surface
29 Axial axis
30 Outer circumference
31 Axial recess
32 Section/Housing section
33 Recess base
34 Rear side
36 Housing-ring surface
38 Spring gap/Axial gap
39 Line
40 Seal ring
42 Inner circumferential surface
44 Incision
48 Base
50 Spring-ring segment
52 Ring arc
54 Ring arc
56 Separation plane

The invention claimed is:
1. A thrust bearing configured to support axial loads that act on a rotating body, the thrust bearing comprising:
a thrust shaft rotatably supported in a bearing housing, the thrust shaft being couplable with the rotating body, at least one thrust collar attached to the thrust shaft, a plurality of thrust pieces, the plurality of thrust pieces forming two thrust-piece ring assemblies disposed on both sides of the thrust collar, and
two retainers for retaining the respective thrust-piece ring assemblies,
wherein the two retainers each have a positioning section for stationary positioning and a spring-ring section configured to axially elastically deform in the event of exceeding a load limit acting on at least one of the thrust pieces, wherein a spring gap is formed between the spring-ring sections and respectively a rear-side housing section and
wherein with respect to a longitudinal axis of the thrust shaft the spring-ring sections are at least one of:
(a) radially outwardly disposed and the positioning sections are radially inwardly disposed, and
(b) include a plurality of spring-ring segments lying adjacent to one another in the circumferential direction, wherein radial incisions in the spring ring sections form the spring-ring segments.

2. The thrust bearing according to claim 1, wherein each spring-ring segment is configured to retain a thrust piece.

3. The thrust bearing according to claim 1, wherein the rear-side housing segments each form an axial limit for the spring-ring sections.

4. The thrust bearing according to claim 1, wherein the thrust pieces are inserted rear-side in a spring-ring side end groove via pins and are secured in the spring-ring side end groove against self-rotating.

5. The thrust bearing according to claim 4, wherein the end groove has an opening for receiving the thrust piece, the thrust piece receiving opening having an annular shape.

6. The thrust bearing according to claim 1, wherein the positioning sections are each a rear-side hub-type projection that extends into an axial recess of the bearing housing.

7. The thrust bearing according to claim 1, wherein the retainers are divided at least in two ring arcs.

8. The thrust bearing according to claim 1,
wherein each spring-ring segment is configured to retain a thrust piece,
wherein the rear-side housing segments each form an axial limit for the spring-ring sections,
wherein the thrust pieces are configured to be inserted in a spring-ring side end groove via pins and are secured in the spring-ring side end groove against self-rotating,
wherein the end groove has an opening for receiving the thrust piece, the thrust piece receiving opening having an annular shape,
wherein the positioning sections are each a rear-side hub-type projection that extends into an axial recess of the bearing housing, and
wherein the retainers are divided at least in two ring arcs.

9. A retainer for retaining a plurality of thrust pieces in a thrust bearing, the retainer including a positioning section for stationary positioning in the thrust bearing and a spring-ring section for axial-elastic deforming in the event of exceeding a load limit acting on at least some of the plurality of the thrust pieces,
wherein with respect to a longitudinal axis of the thrust shaft the spring-ring section is at least one of:
(a) radially outwardly disposed and the positioning section is radially inwardly disposed, and
(b) includes a plurality of spring-ring segments lying adjacent to one another in the circumferential direction, wherein radial incisions in the spring ring section form the spring-ring segments.

10. A thrust bearing configured to support axial loads that act on a rotating body the thrust bearing comprising:
- a thrust shaft rotatably supportable in a bearing housing, the thrust shaft being couplable with the rotating body;
- a thrust collar;
- a retainer supported by the bearing housing and configured to slidingly support a plurality of thrust pieces;
- the plurality of thrust pieces each having a front sliding surface in sliding contact with the thrust collar; and
- the retainer comprising a disk having a central opening and an outer circumference and a plurality of radial incisions extending radially inwardly from the outer circumference and having inner ends radially spaced from the central opening, the radial incisions defining circumferentially adjacent spring sections, each of the spring sections being individually axially flexible against and away from the bearing housing to individually open and close a spring gap between each of the spring sections and the bearing housing.

11. The thrust bearing according to claim 10, wherein each of the spring sections supports a single one of the plurality of thrust pieces.

12. The thrust bearing according to claim 11, wherein the retainer includes an axially facing circumferential groove, wherein each of the thrust pieces includes an axial projection, and wherein the axial projections are slidably mounted in the circumferential groove.

\* \* \* \* \*